US008217605B2

(12) United States Patent
Balazovic et al.

(10) Patent No.: US 8,217,605 B2
(45) Date of Patent: Jul. 10, 2012

(54) MOTOR CONTROLLER FOR DETERMINING A POSITION OF A ROTOR OF AN AC MOTOR, AC MOTOR SYSTEM, AND METHOD OF DETERMINING A POSITION OF A ROTOR OF AN AC MOTOR

(75) Inventors: Peter Balazovic, Roznov (CZ); Roman Filka, Roznov P. Radhostem (CZ)

(73) Assignee: Freescale Semiconductor, Inc., Austin, TX (US)

( * ) Notice: Subject to any disclaimer, the term of this patent is extended or adjusted under 35 U.S.C. 154(b) by 321 days.

(21) Appl. No.: 12/673,173

(22) PCT Filed: Aug. 20, 2007

(86) PCT No.: PCT/IB2007/053318
§ 371 (c)(1),
(2), (4) Date: Feb. 12, 2010

(87) PCT Pub. No.: WO2009/024835
PCT Pub. Date: Feb. 26, 2009

(65) Prior Publication Data
US 2011/0199031 A1 Aug. 18, 2011

(51) Int. Cl.
*H02P 6/18* (2006.01)
(52) U.S. Cl. .............. 318/400.33; 318/400.02; 318/599; 318/632
(58) Field of Classification Search ............. 318/400.02, 318/400.33, 599, 632
See application file for complete search history.

(56) References Cited

U.S. PATENT DOCUMENTS 6,163,127 A   12/2000  Patel et al.
6,492,788 B1 * 12/2002  Agirman et al. ............... 318/700
(Continued)

FOREIGN PATENT DOCUMENTS
WO        02/39575 A    5/2002

OTHER PUBLICATIONS

International Search Report and Written Opinion correlating to PCT/IB2007/053318 dated Jul. 30, 2008.

*Primary Examiner* — Paul Ip

(57) ABSTRACT

A motor controller for determining a position of a rotor of an AC motor, the motor controller comprises a control input for receiving a control signal, an output for providing a power control signal for controlling power applied to a stator of the AC motor, and an input for receiving a feedback signal representative of the current in the stator. The control input and output are coupled by a reference path, and the input is coupled to the control input by a feedback path. A carrier signal injection element injects a high frequency carrier signal in the reference path at an injection node. The motor controller is arranged to generate the power control signal in dependence on the control signal, the feedback signal, and the high frequency carrier signal. A position determining element generates a position signal representing the position of the rotor in dependence on the feedback signal which includes a carrier signal component comprising rotor position information. The motor controller further comprises a filter block coupled between the control input and the injection node in the reference path for filtering signals in the reference path in a frequency range including the frequency of the high frequency carrier signal.

20 Claims, 3 Drawing Sheets

U.S. PATENT DOCUMENTS

| | | |
|---|---|---|
| 6,763,622 B2 | 7/2004 | Schulz et al. |
| 6,894,454 B2 | 5/2005 | Patel et al. |
| 6,924,617 B2 | 8/2005 | Schulz et al. |
| 7,190,130 B2 * | 3/2007 | Wogari et al. ............ 318/400.02 |
| 7,348,749 B2 * | 3/2008 | Ide et al. ....................... 318/599 |
| 2004/0070362 A1 | 4/2004 | Patel et al. |
| 2004/0119778 A1 * | 6/2004 | Naito .............................. 347/37 |
| 2004/0155620 A1 * | 8/2004 | Myers et al. .................. 318/632 |
| 2005/0151502 A1 | 7/2005 | Quirion |
| 2006/0061319 A1 | 3/2006 | Markunas et al. |
| 2006/0091845 A1 | 5/2006 | Consoli et al. |
| 2006/0097688 A1 | 5/2006 | Patel et al. |
| 2006/0097702 A1 | 5/2006 | Nagashima et al. |
| 2011/0199031 A1 * | 8/2011 | Balazovic et al. ....... 318/400.33 |

\* cited by examiner

MOTOR CONTROLLER FOR DETERMINING A POSITION OF A ROTOR OF AN AC MOTOR, AC MOTOR SYSTEM, AND METHOD OF DETERMINING A POSITION OF A ROTOR OF AN AC MOTOR

FIELD OF THE DISCLOSURE

This disclosure relates to a motor controller for determining a position of a rotor of an AC motor an AC motor system and a method of determining a position of a rotor of an AC motor.

BACKGROUND

AC motors are widely used in many applications, including consumer applications such as washing machines, dish washers, electric fans, and automotive applications such as window lift control, electrical power steering systems, electro-mechanical brake systems and the like.

AC motor systems typically comprise a motor comprising a stator and a rotor and a motor controller to control the power supplied to drive the motor. In order to ensure good control of the motor, for example in order to meet specified motor performance requirements, the motor controller is required to know the position of the motor rotor.

Position sensors, such as position and velocity transducers, and the cabling and connectors required for such position sensors, increase the size, weight and complexity of the AC motor system and have also been a source of failure for AC motor systems. In order to eliminate such position sensors, particularly for small low cost motor controllers, much research has taken place into sensorless techniques for determining rotor position for different classes of motors under a variety of different operating conditions.

A simple technique uses the induced back electromotive force (EMF) generated in the motor. However, at rotor standstill or low speed there is insufficient back electromotive force (EMF) generated in the motor to enable an accurate estimate of rotor position.

More complex techniques are based upon injection of appropriate reference signals and the tracking of the response of the AC motor to the injected reference signal in order to determine the rotor position. The basis for most low and zero speed sensorless control techniques is the presence of a difference in the d-axis and q-axis characteristics of a motor: the d-axis and the q-axis define the dq rotating reference frame. This difference is used to determine the rotor position and is referred to as saliency. The motor characteristics may include for example inductance, or resistance. A salient motor is a motor that exhibits saliency, for example, a difference in inductance in the d-axis and q-axis depending on the position of the rotor. In a Permanent Magnet (PM) motor, there are several sources of saliencies, for example, rotor inherent saliency, saturation based saliency (stator, teeth).

Typically, as described for example, in US patent application no. 2006/0061319 and U.S. Pat. No. 6,894,454, a high frequency carrier signal is injected into the stator by combining the carrier signal with the reference voltage signal that controls the power provided to the stator of the AC motor. The resulting high frequency components, which carry the saliency position information and which are part of the feedback current from the stator, are then processed by a processor in the motor controller to determine the rotor position. The feedback current is also fed back as part of a control loop in the controller to control the power applied to the stator.

High frequency harmonic components are generated in the motor due to the carrier signal and the reference voltage signal and the operation of the control loop, for example during changes in motor load. Known sensorless control methods do not take account of the interference caused between the high frequency components carrying the saliency position information with the high frequency harmonic components generated in the control loop. Such interference impacts the performance of the motor controller in determining the rotor position.

Thus, there is a need for an improved motor controller.

SUMMARY

The present invention provides a motor controller, an AC motor system, a method of determining a position of a rotor of an AC motor, a computer program and a computer-readable medium as described in the accompanying claims.

BRIEF DESCRIPTION OF THE DRAWINGS

A motor controller, an AC motor system and a method of determining a position of a rotor of an AC motor in accordance with the present disclosure will now be described, by way of example only, with reference to the accompanying drawings in which.

DETAILED DESCRIPTION OF THE DRAWINGS

The present disclosure will be described with reference to a 3-phase Permanent Magnet Synchronous (PMS) motor. It will be appreciated that the disclosure is not limited to use with a 3-phase PMS motor and may apply to any AC motor with saliency, for example 2-phase AC motors, a PM motor with the permanent magnet buried in the motor or surface mounted, Synchronous Reluctance Motor (SynRM), Switched Reluctance Motor (SRM), AC Induction Motor (ACIM) or AC linear motors.

Figure 1:
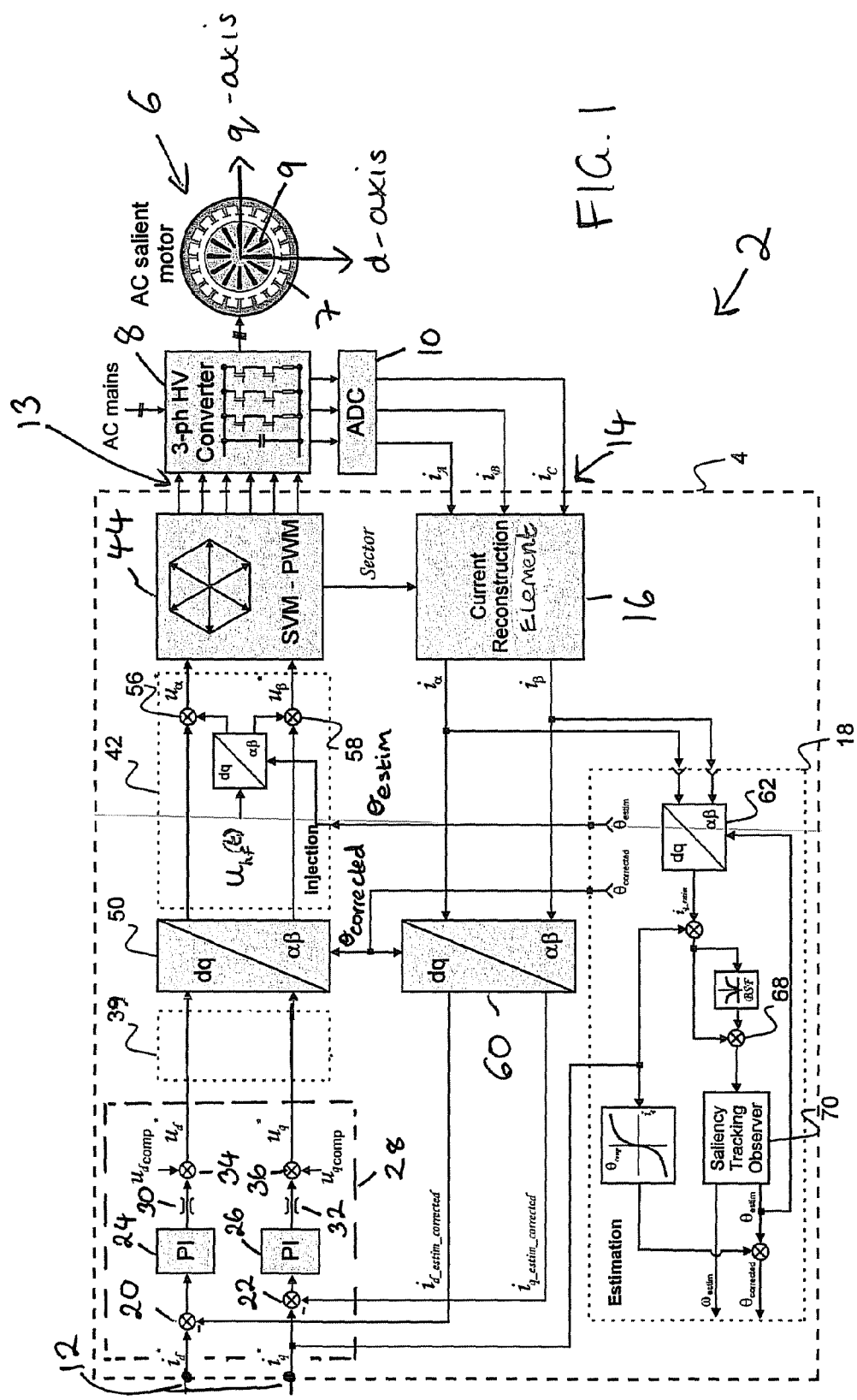
FIG. 1 is a simplified block schematic diagram of an AC motor system comprising a motor controller in accordance with an embodiment of the disclosure.

Referring first to FIG. 1, an AC motor system 2 comprises an AC motor 6 having a stator 7 and rotor 9, a power converter 8 for providing power to the stator 7 and a motor controller 4 in accordance with the disclosure for controlling the power converter 8 and for determining the position of the rotor 9. The power converter 8 is coupled to an AC supply (not shown) and has an output coupled to an analog-to-digital converter (ADC) 10. The dq rotating reference frame is shown in FIG. 1 for illustrative purposes.

The motor controller 4 comprises a control input 12 for receiving a control signal which includes a current control signal component in the d-axis $i_d^*$ and a current control signal component in the q-axis $i_q^*$. The control signal at the control input 12 is generated for example by a master controller, such as the main vehicle controller in an automotive application or washer controller in a consumer washer application, which generates a torque request. The current control signal components $i_d^*$ and $i_q^*$ are processed in processing block 28 and the output of processing block 28 are voltage control signal components in the d-axis $u_d^*$ and q-axis $u_q^*$. Processing block 28 in accordance with an embodiment comprises combining elements 20 and 22 which are arranged to subtract corrected estimations of the current control signal components $i_{d\_estim\_corrected}$ and $i_{q\_estim\_corrected}$ from the current control signal components $i_d^*$ and $i_q^*$, and Proportional Integration (PI) controllers 24 and 26. The PI controllers 24 and 26 compare the corrected estimations of the current control signal components $i_{d\_estim\_corrected}$ and $i_{q\_estim\_corrected}$ with the current control signal components $i_d^*$ and $i_q^*$ and the difference (or 'error' signal) is used by the motor controller 4 to adjust the control signals applied to the power converter 8 so that the corrected estimations of the current control signal components $i_{d\_estim\_corrected}$ and $i_{q\_estim\_corrected}$ are adjusted to the current control signal components $i_d^*$ and $i_q^*$ in a closed control loop. The processing block 28 may further comprise in an embodiment limiting elements 30, 32 which are arranged to limit the power control signals at the output of the motor controller 4 to predetermined limits which limits are determined by the output power achievable by the power converter 8, and compensation elements 34, 36 for combining compensation voltages in the d-axis and q-axis to the voltage control signal components at the output of the PI controllers 24 and 26. Compensation voltages may be added to cancel any dependency between the d and q axis which helps to achieve linear and independent control of the d and q axis currents.

The voltage control signal components in the d-axis $u_d^*$ and q-axis $u_q^*$ at the output of the processing block 28 are coupled to a filter block 39 and the filtered signals at the output of the filter block 39 are coupled to a transformation element 50 which is coupled to a carrier signal injection element 42. The filtered voltage control signal components $u_d^*$ and $u_q^*$ are transformed in transformation element 50 from the dq rotating reference frame to the αβ stationary reference frame using a corrected rotor angular position θcorrected which is generated by a position determining element or saliency extraction element 18. The carrier signal injection element 42 injects a high frequency carrier signal $u_{hf}(t)$ into the transformed voltage control signal components in the d-axis $u_d^*$ only and provides voltage control signal components in the αβ stationary reference frame which are coupled to a Space Vector Modulation (SVM) 44 and which provide power control signals at an output 13 of the motor controller 4. The power control signals at the output 13 of the motor controller 4 are coupled to the power converter 8 so as to control the power applied to the stator 7. Thus, a reference path is provided between the control input 12 and the output 13 including processing block 28, filter block 39, the transformation element 50 and the carrier signal injection element 42 which injects a high frequency carrier signal $u_{hf}(t)$ into the voltage control signal components provided in the reference path at an injection node in the reference path. More details of carrier signal injection element 42 and the filter block 39 are provided below with reference to FIG. 2.

Space Vector Modulation (SVM) are well known in the art and will not be described in any more detail herein.

The motor controller 4 further includes an input 14 coupled to the ADC 10 for receiving measured current signals from the power converter 8 and a current reconstruction element 16 for deriving a feedback signal representative of the current signal in the stator from the current signals at the input 14. In the embodiment shown and described herein, the AC motor 6 is a 3-phase motor and so the power converter 8 is a 3-phase power converter. Thus, a function of the reconstruction element 16 is to reconstruct the current signal in the stator from the measured current signals which reconstruction is necessary due to the 3-phase nature of the power converter 8. The current signal in the stator includes torque and flux producing components and carrier signal current components. As discussed in the introduction, the carrier signal current components contain rotor position information. Another function of the reconstruction element 16 is to transform the received measured current signals to the αβ stationary reference frame. Thus, the feedback signal at the output of the reconstruction element includes a feedback signal current component $i_\alpha$ in the α axis of the stationary reference frame and a feedback signal current component $i_\beta$ in the β axis of the stationary reference frame.

Descriptions of example current reconstruction elements that may be used in the motor controller 4 in accordance with the disclosure is given in Application Note AN 1930 (section 7.6.1) and in Application Note AN1931 (section 4.3.2) produced by Freescale Semiconductor, Inc. It will be appreciated that the current reconstruction element 16 may be constructed differently (e.g. $i_\alpha$, $i_\beta$ can be reconstructed by single shunt measurement of DC bus current) such as to provide the αβ stationary components of the stator current.

The feedback signal current component $i_\alpha$ and the feedback signal current component $i_\beta$ are coupled to the position determining element or saliency extraction element 18. More details of the position determining element 18 will be given below with reference to FIG. 2. The position determining element 18 generates a position signal representing the position of the rotor in dependence on the feedback signal current component $i_\alpha$ and the feedback signal current component $i_\beta$ of the feedback signal. The position signal includes an estimate of the rotor angular position θestim and a corrected rotor angular position θcorrected. In addition, the position determining element 18 generates an estimate of the rotor speed ωestim and corrected estimations of the current control signal component in the d-axis $i_{d\_estim\_corrected}$ and a current control signal component in the q-axis $i_{q\_estim\_corrected}$. The corrected estimations of the current control signal components $i_{d\_estim\_corrected}$ and $i_{q\_estim\_corrected}$ are combined in combining elements 20 and 22 with the current control signal components $i_d^*$ and $i_q^*$ provided at the control input 12 so that a feedback path is provided coupling the feedback signal representative of the current signal in the stator to the control input 12 so as to provide a closed loop control of the current components to control the power supplied to the stator 7. Thus, the power control signals at the output 13 depend on the control signal at the control input 12, the feedback signal which is part of the closed loop control, and the high frequency carrier signal CS which is injected into the reference path.

Figure 2:
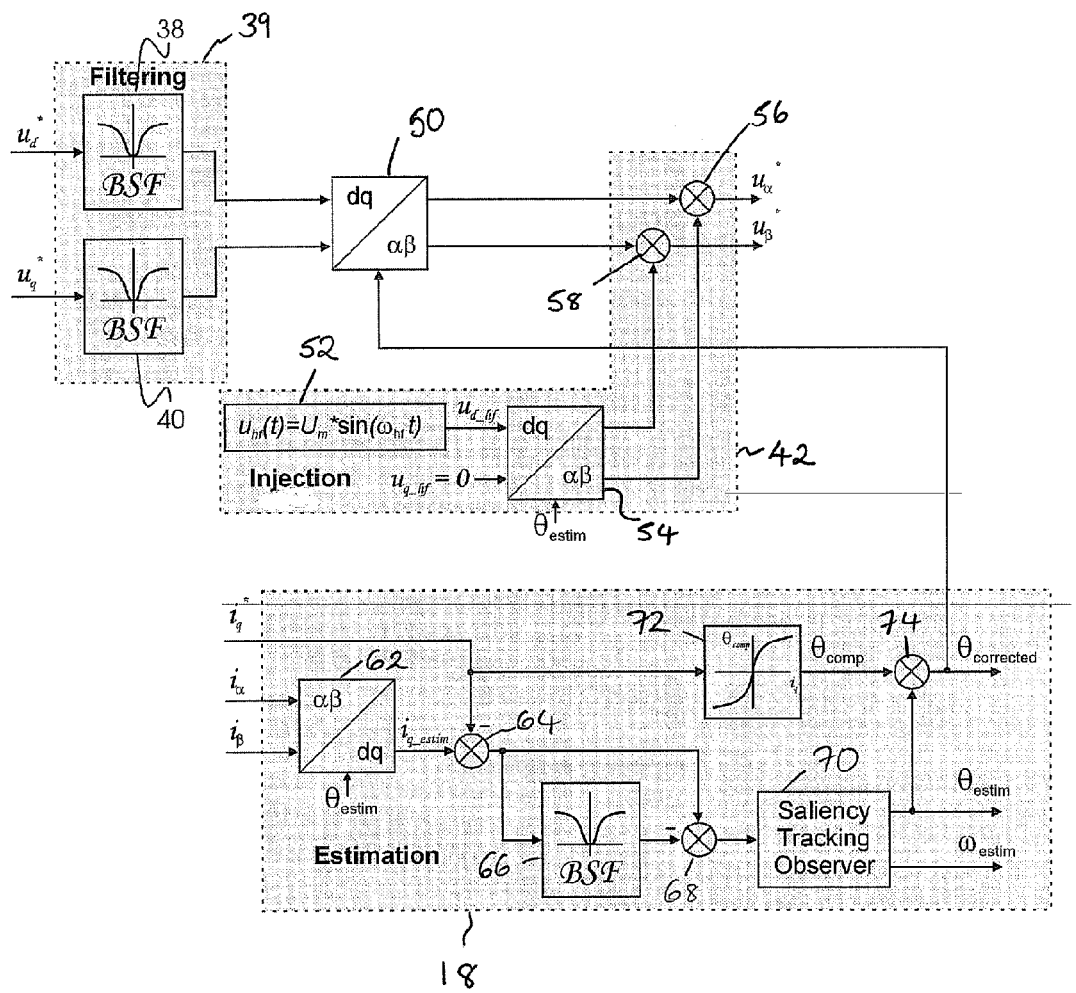
FIG. 2 is a simplified block schematic diagram showing some of the elements according to an embodiment of the disclosure of the motor controller of FIG. 1 in more detail.

Referring now also to FIG. 2 which provides a more detailed schematic diagram of the filter block 39, the carrier signal injection element 42 and the position determining element 18.

The filter block 39 comprises filter elements 38 and 40 arranged to filter the voltage control signal components $u_d^*$ and $u_q^*$ in the reference path in a frequency range including the frequency of the high frequency carrier signal $u_{hf}(t)$. The filter elements 38 and 40 thus filter or remove any harmonic components, for example due to the operation of the closed loop control, in the proximity of or around the carrier signal frequency so that the frequency spectra of the voltage control signal components $u_d^*$ and $u_q^*$ around the carrier signal frequency is empty. In FIG. 2, the filter elements 38 and 40 are represented by Band Stop Filters (BSF) 38 and 40. However, it will be appreciated that the filter elements 38 and 40 may be implemented in other ways. For example, a combination of low and high pass filters or a bandpass filter in complementary arrangement (Input-BPF{Input}).

The filtered voltage control signal components $u_d^*$ and $u_q^*$ are then transformed in transformation element 50, which may be part of the carrier signal injection element 42 or a separate element as shown in FIGS. 1 and 2, from the dq rotating reference frame to the αβ stationary reference frame using the corrected rotor angular position θcorrected which is generated by the position determining element 18. Such a transformation element is well known in the art. The corrected rotor angular position θcorrected is used for the transformation due to the fact that the estimated rotor angular position θestim is displaced from the actual position due to armature reaction whereas the corrected rotor angular position has been corrected to compensate for armature reaction. Armature reaction is described in more detail below. However, the estimated rotor angular position θestimated may be used to perform the transformation when armature reaction is not an issue.

The carrier signal injection element 42 comprises a carrier signal generator 52 for generating a high frequency carrier signal $(u_{hf}(t)=U_M^*\sin(\omega_{hf}t))$. It is desirable to choose the frequency of the carrier signal to be as high as possible so as to allow for easy spectral separation from the control signals. However, the frequency selection must also account for the fact that the frequency must not be too high compared to the switching frequency of the power converter 8. Thus, the frequency of the carrier signal is typically several tenths greater than the frequency of the control signal in the reference path. For example, the carrier signal may have a frequency in the range of 500 Hz to 2000 Hz. The high frequency carrier signal is injected on the d-axis and so the voltage component of the high frequency carrier signal on the d-axis is $u_{d\_hf}$ and there is no voltage component on the q-axis. Since in the dq rotating reference frame, the d-axis current component is the electromagnetic field producing current and the q-axis current component is the torque producing current, by keeping the injected voltage component in the q-axis zero (or small), any unwanted torques are also kept small. The high frequency carrier signal components are transformed in transformation element 54 from the dq rotating reference frame to the αβ stationary reference frame using the estimate of the rotor angular position θestim which is generated by the position determining element 18. The estimate of the rotor angular position θestim is used for the transformation because the injection of the high frequency carrier signal as well as the estimation of the control signal current must be performed in the estimated frame since this is where the local minimum of high frequency coupling impedance exists which minimum corresponds to the equilibrium point where the saliency tracking observer (described below) will stabilise.

The output of the transformation element 54 is coupled to combination elements 56 and 58 so that the transformed high frequency carrier signal components in the α-axis and β-axis are combined with the filtered voltage control signal components in the α-axis and β-axis to provide voltage control signal components in the αβ stationary reference frame which define the power control signal for controlling power to the stator 7.

The power control signal therefore includes the voltage control signal components based on the control signal at the input 12 and superimposed or injected high frequency carrier signal components. The high frequency carrier signal induces a current signal in the stator 7, which is amplitude modulated depending on the effective rotor saliency (which varies according to rotor position). The voltage control signal components and the high frequency carrier signal components are sufficiently separated in the frequency spectra to not interfere with each other. The rotor position information can be extracted from the feedback signal derived from the measured current signals from the power converter 8.

The position determining element 18 includes a transformation element 62 for transforming the feedback signal current components $i_\alpha$ and $i_\beta$ provided by the current reconstruction element 16 from the αβ stationary reference frame to the dq rotating reference frame using the estimate of the rotor angular position θestimate which is generated by the position determining element 18. As above, the estimate of the rotor angular position θestim is used for the transformation because the estimation of the control signal current as well as the injection of the high frequency carrier signal must be performed in the estimated frame since this is where the local minimum of high frequency coupling impedance exists which minimum corresponds to the equilibrium point where the saliency tracking observer (described below) will stabilise. The output of the transformation element 62 is an estimate of the current control signal component in the q-axis $i_{q\_estim}$ based on the feedback signal and is coupled to combining element 64. The current control signal component in the q-axis $i_q^*$ provided at the control input 12 is subtracted from the estimate of the current control signal component in the q-axis $i_{q\_estim}$ by the combining element 64 to provide a signal which represents the error in the estimate of the current control signal and includes the high frequency carrier signal current components in the feedback signal. The output of the combining element 64 is fed to an extracting element including combining element 68 and a filter element 66: the output of the combining element 64 is fed to one input of combining element 68 and via the filter element 66 to another input of the combining element 68. The filter element 66 is shown in FIG. 2 as being implemented as a Band Stop Filter (BSF). However, it will be appreciated that the filter element 66 may be implemented in other ways. For example, a high order band pass filter with small phase shift may be used.

Figure 3:
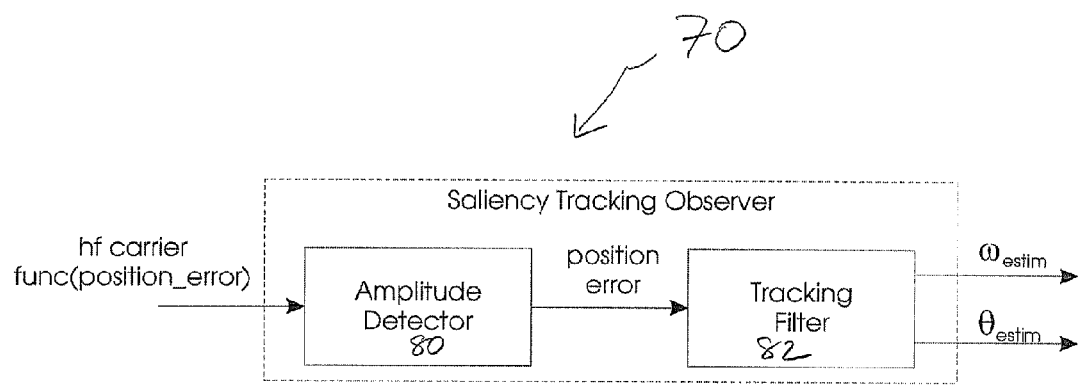
FIG. 3 is a simplified block schematic diagram of a saliency tracking observer according to an embodiment of the disclosure for use in the motor controller of FIG. 1.

The combining element 68 subtracts the signal at the output of combining element 64 from the filtered signal to extract the high frequency carrier signal components from the feedback signal which include the saliency information or rotor position information. The extracted high frequency carrier signal components hf carrier=func(position_error) are passed to a saliency tracking observer 70 or position signal generator which uses the rotor position information in the extracted high frequency carrier signal components to generate the estimate of the rotor angular position θestim, and the estimate of the rotor speed ωestim. An example implementation of the saliency tracking observer 70 is shown in FIG. 3. The saliency tracking observer 70 comprises an amplitude detector 80 and a tracking filter 82. The amplitude detector utilises a homodying process, which by definition is the demodulation of a signal by multiplication with a sinusoidal signal that is in phase and frequency synchronism with the incoming carrier frequency. The detected amplitude of the extracted high frequency carrier signal components is directly proportional to the estimated position error. The resulting signal is used as an input to the tracking filter 82 which provides estimates of rotor angular position θestim, and rotor speed ωestim. The following publications provide more information on implementations of a saliency tracking observer: B. P. Lathi, Modern Digital and Analog Communication Systems, Oxford University Press, USA; 3 edition (Mar. 11, 1998), M. Mienkina, P. Pekarek, F. Dobes: 56F80x Resolver Driver and Hardware Interface, Freescale Semiconductor, Inc. Application Note AN1942, R. D. Lorenz, Observers and State Filters in Drives and Power Electronics, Keynote paper, IEEE IAS OPTIM 2002, Brasov, Romania, May 16-18, 2002, and G.

Ch. Hsieh, J.C. Hung, Phase-lock loop techniques—a survey, IEEE Transaction on IE, vol. 43, No. 6, December 1996.

By subtracting the current control signal component in the q-axis from the estimate of the current control signal component in the q-axis $i_{q\_estim}$ in the combining means 64, the motor controller 4 according to the disclosure improves the attenuation of the DC component and other harmonic components in the estimate of the current control signal component in the q-axis $i_{q\_estim}$. This makes it easier to filter out the high frequency components which carry the rotor position information.

In addition, by extracting the high frequency carrier signal components using the filter element 66 and combining element 68, unwanted harmonic signals around the frequency of the carrier signal are removed which results in reduced phase distortion of the carrier signal in the feedback signal and so an improvement in the control response of the saliency tracking observer 70.

A transformation element 60 transforms the feedback signal current components $i_\alpha$ and $i_\beta$ provided by the current reconstruction element 16 from the $\alpha\beta$ stationary reference frame to the dq rotating reference frame using the estimate of the rotor angular position θcorrected which is generated by the position determining element 18. The corrected rotor angular position θcorrected is used for the transformation due to the fact that the estimated rotor angular position θestim is displaced from the actual position due to armature reaction whereas the corrected rotor angular position has been corrected to compensate for armature reaction. Armature reaction is described in more detail below. However, the estimated rotor angular position θestimated may be used to perform the transformation when armature reaction is not an issue. The corrected estimations of the current control signal component in the d-axis $i_d$_estim_corrected and a current control signal component in the q-axis $i_d$_estim_corrected are provided at the output of transformation element 60.

The current control signal component in the q-axis $i_q^*$ provided at the control input 12 is also coupled to a load correction element 72. Saliency depends on applied load. In other words, if the load on the AC motor 6 changes, there is an effect of armature reaction which in turn affects the saliency of the AC motor 6. The current control signal component in the q-axis $i_q^*$ is directly related to the load. The load correction element 72 provides a correction to the estimated position of the rotor due to the response of the rotor 9 to variations in load. The load correction element 72 may be implemented by means of a look-up table having a list of correction values to the estimated rotor position for a number of different loads as indicated by different values of the current control signal component $i_q^*$. In another embodiment, load correction element 72 may comprise a memory for storing parameters of the AC motor so that the value of the correction to the estimated position of the rotor can be calculated in real-time based on the current control signal component $i_q^*$ at the input of the load correction element 72.

In an embodiment, the correction element 72 performs a phase compensation of the saliency tracking observer 70 estimate of the rotor angular position θestim. In general, a commissioning process is used to obtain the phase compensation table 72. The following publication provides more information on an off-line commissioning process: Joachim Holtz and Lothar Springob: Identification and Compensation of Torque Ripple in High-Precision Permanent Magnet Motor Drives.

In the case of a 3-phase Permanent Magnet Synchronous (PSM) motor, the values of the phase compensation table 72 are obtained by an analytical calculation expressed as:

$$\theta\_compensation = \text{Arc Tan}((iq^* \times Lq(iq))/\Psi pm) \qquad \text{Equation 1}$$

Where:

Iq* is the torque producing current control signal component in the q-axis,

Lq(iq) is the quadrature axis inductance in dependence of loading and is specified by the motor manufacturer, Ψpm is the magnetic flux of the rotor permanent magnets.

The use of an analytical calculation such as that of Equation 1 avoids the need for a commissioning process and only the values of the magnitude of the magnetic flux and quadrature inductance are necessary. Similar analytical equations can be derived for other types of motors.

The correction value provided by the load correction element 72 and corresponding to the current control signal component $i_q^*$ at the input of the load correction element 72 is added to the estimate of the rotor angular position θestim provided at the output of the saliency tracking observer 70 at combining element 74 so as to provide the corrected rotor angular position θcorrected.

It will be appreciated that in an alternative embodiment, the filter block 39 and the carrier signal injection element 42 may be used with a known position determining element which known position determining element does not include the filter element 66, combining element 68 and load correction element 72 as described above. It will however be appreciated that an embodiment including the filter block 39, the carrier signal injection element 42 and a position determining element including the filter element 66, combining element 68 and load correction element 72 has enhanced performance over embodiments which include one or more of such elements by way of improved control response and stability of the saliency tracking observer in the case of load current transients.

In summary, by having filter elements in the reference path prior to injecting the high frequency carrier signal, the motor controller in accordance with the disclosure ensures that unwanted frequency harmonic components in the proximity of the frequency of the carrier signal are removed which improves phase distortion and reduces interference with the carrier signal resulting in improved extraction of the high frequency components carrying the saliency information and hence improved performance in determining the position of the rotor by the position determining element.

In an embodiment having a filter element to extract the carrier signal from the feedback signal and by subtracting the current control signal component $i_q^*$ further enhances the performance of determining rotor position by improving phase distortion and improving the response of the saliency tracking observer.

In an embodiment having a load correction element, corrections can be made to the determined rotor position to compensate for load transients.

The motor controller 4 shown in FIGS. 1 and 2 and described above with reference to FIGS. 1 and 2 is represented by a number of blocks or elements for performing different functions. The blocks may be implemented in software for execution in a controller, microprocessor or similar device. In such an implementation, the motor controller 4 may be the device or may be part of one or more controllers, microprocessors or similar devices with the different functions distributed across the devices.

In the description above, the high frequency carrier signal is injected into the d-axis of the dq rotating reference frame. It will be appreciated that the present disclosure may apply to an arrangement in which the high frequency carrier signal is injected into a different rotating frame (e.g. rotating frame is phase shifted relative to the rotor) or the stationary reference frame. An injection technique into the stationary reference frame is well known and produces different current motor response due to saliency as that when the injection is into the rotating reference frame.

The described technique for determining a position of a rotor of an AC motor in accordance with the disclosure may be used for motor rotation speeds in the range of zero to medium speeds. At high speeds, such a technique can be used but the back EMF techniques described above in the introduction work more efficiently at high speeds compared to injection techniques.

In the foregoing specification, the invention has been described with reference to specific examples of embodiments of the invention. It will, however, be evident that various modifications and changes may be made therein without departing from the broader scope of the invention as set forth in the appended claims.

The invention claimed is:

1. A motor controller for determining a position of a rotor of an AC motor, the motor controller comprising:
    a control input for receiving a control signal, an output for providing a power control signal for controlling power applied to a stator of the AC motor, the control input and output being coupled by a reference path;
    an input for receiving a feedback signal representative of the current in the stator, the input being coupled to the control input by a feedback path;
    a carrier signal injection element for injecting a high frequency carrier signal in the reference path at an injection node, the motor controller being arranged to generate the power control signal in dependence on the control signal, the feedback signal, and the high frequency carrier signal;
    a position determining element for generating a position signal representing the position of the rotor in dependence on the feedback signal which includes a carrier signal component comprising rotor position information;
    a filter block coupled between the control input and the injection node in the reference path for filtering signals in the reference path in a frequency range including the frequency of the high frequency carrier signal; and
    a load correction element for generating a correction value for the position of the rotor due to the response of the rotor to variations in load and a combining element for combining the correction value with the position signal to generate a corrected position signal.

2. The motor controller of claim 1, further comprising a processing block coupled to the control input and to the feedback path for receiving the control signal and the feedback signal, the processing block being arranged to compare the control signal and the feedback signal and to control the power control signal such that feedback signal tends towards the control signal under closed loop control.

3. The motor controller of claim 2, wherein the filter block comprises at least one of a Band Stop Filter, a bandpass filter, and a combination of low and high pass filters.

4. The motor controller of claim 2, wherein the position determining element comprises:
    a first input for receiving the feedback signal;
    a second input for receiving a component of the control signal;
    a transformation element coupled to the first input for providing an estimate of a control signal from the feedback signal, the estimate including a carrier signal component comprising rotor position information;
    a combining element for subtracting the estimate of the control signal from the component of the control signal to provide a difference control signal including the carrier signal component;
    an extracting element for extracting the carrier signal component from the difference control signal to provide an extracted carrier signal component; and
    a position signal generator for generating the position signal in dependence on the extracted carrier signal component.

5. The arrangement of claim 2, wherein the load correction element includes an input for receiving a component of the control signal and a look-up table comprising different correction values for different values of the component of the control signal.

6. The motor controller of claim 1, wherein the filter block comprises at least one of the group consisting of a Band Stop Filter, a bandpass filter, and a combination of low and high pass filters.

7. The motor controller of claim 6, wherein the position determining element comprises:
    a first input for receiving the feedback signal;
    a second input for receiving a component of the control signal;
    a transformation element coupled to the first input for providing an estimate of a control signal from the feedback signal, the estimate including a carrier signal component comprising rotor position information;
    a combining element for subtracting the estimate of the control signal from the component of the control signal to provide a difference control signal including the carrier signal component;
    an extracting element for extracting the carrier signal component from the difference control signal to provide an extracted carrier signal component; and
    a position signal generator for generating the position signal in dependence on the extracted carrier signal component.

8. The arrangement of claim 6, wherein the load correction element includes an input for receiving a component of the control signal and a look-up table comprising different correction values for different values of the component of the control signal.

9. The motor controller of claim 1, wherein the position determining element comprises:
    a first input for receiving the feedback signal;
    a second input for receiving a component of the control signal;
    a transformation element coupled to the first input for providing an estimate of a control signal from the feedback signal, the estimate including a carrier signal component comprising rotor position information;
    a combining element for subtracting the estimate of the control signal from the component of the control signal to provide a difference control signal including the carrier signal component;
    an extracting element for extracting the carrier signal component from the difference control signal to provide an extracted carrier signal component; and
    a position signal generator for generating the position signal in dependence on the extracted carrier signal component.

10. The arrangement of claim 9, wherein the extracting element comprises a filter element for filtering the difference control signal in a frequency range including the frequency of the high frequency carrier signal and combining element for subtracting the difference control signal from the filtered difference control signal to provide the extracted carrier signal component.

11. The arrangement of claim 9, wherein the load correction element includes an input for receiving a component of the control signal and a look-up table comprising different correction values for different values of the component of the control signal.

12. The arrangement of claim 10, wherein the load correction element includes an input for receiving a component of the control signal and a look-up table comprising different correction values for different values of the component of the control signal.

13. The arrangement of claim 1, wherein the load correction element includes an input for receiving a component of the control signal and a look-up table comprising different correction values for different values of the component of the control signal.

14. The arrangement of claim 1, wherein the load correction element includes an input for receiving a component of the control signal and means for generating a correction value using the following equation:

$$\theta\_compensation = \text{Arc Tan}\,((iq^* \times Lq(iq))/\Psi pm) \quad \text{Equation 1}$$

Where:
θ_compensation is the correction value,
iq* is the component of the control signal,
Lq(iq) is the quadrature axis inductance in dependence of loading,
Ψpm is the magnetic flux of the magnets of the rotor.

15. An AC motor system comprising an AC motor having a stator and a rotor, a power converter for providing power to the stator and a motor controller as claimed in claim 1 for determining the position of the rotor of the AC motor.

16. A method of determining a position of a rotor of an AC motor comprising:
receiving a control signal at a control input;
providing a power control signal at an output for controlling power applied to a stator of the AC motor, the control input and output being coupled by a reference path;
receiving a feedback signal representative of the current in the stator at an input, the input being coupled to the control input by a feedback path;
injecting a high frequency carrier signal in the reference path at an injection node, wherein the power control signal is generated in dependence on the control signal, the feedback signal, and the high frequency carrier signal;
generating a position signal representing the position of the rotor in dependence on the feedback signal which includes a carrier signal component comprising rotor position information;
filtering signals in the reference path by a filter block coupled between the control input and the injection node in a frequency range including the frequency of the high frequency carrier signal; and
generating a correction value for the position of the rotor due to the response of the rotor to variations in load and combining the correction value with the position signal to generate a corrected position signal.

17. The method of claim 16, wherein said generating a position signal representing the position of the rotor comprises:
receiving the feedback signal;
receiving a component of the control signal;
providing an estimate of a control signal from the feedback signal, the estimate including a carrier signal component comprising rotor position information;
subtracting the estimate of the control signal from the component of the control signal to provide a difference control signal including the carrier signal component;
extracting the carrier signal component from the difference control signal to provide an extracted carrier signal component;
generating the position signal in dependence on the extracted carrier signal component.

18. The method of claim 17, wherein said extracting comprises filtering the difference control signal in a frequency range including the frequency of the high frequency carrier signal and subtracting the difference control signal from the filtered difference control signal to provide the extracted carrier signal component.

19. The method of claim 16, wherein said generating a correction value comprises receiving a component of the control signal and generating a correction value using the following equation:

$$\theta\_compensation = \text{Arc Tan}\,((iq^* \times Lq/\Psi pm)) \quad \text{Equation 1}$$

Where:
θ_compensation is the correction value,
Iq* is the component of the control signal,
Lq is the quadrature axis inductance in dependence of loading,
Ψpm is the magnetic flux of the magnets of the rotor.

20. A computer-readable medium carrying a computer program comprising program instructions adapted to perform a method of determining a position of a rotor of an AC motor when said program is run on a data processing system, the method comprising:
receiving a control signal at a control input;
providing a power control signal at an output for controlling power applied to a stator of the AC motor, the control input and output being coupled by a reference path;
receiving a feedback signal representative of the current in the stator at an input, the input being coupled to the control input by a feedback path;
injecting a high frequency carrier signal in the reference path at an injection node, wherein the power control signal is generated in dependence on the control signal, the feedback signal, and the high frequency carrier signal;
generating a position signal representing the position of the rotor in dependence on the feedback signal which includes a carrier signal component comprising rotor position information;
filtering signals in the reference path by a filter block coupled between the control input and the injection node in a frequency range including the frequency of the high frequency carrier signal; and
generating a correction value for the position of the rotor due to the response of the rotor to variations in load and combining the correction value with the position signal to generate a corrected position signal.

\* \* \* \* \*

UNITED STATES PATENT AND TRADEMARK OFFICE
CERTIFICATE OF CORRECTION

PATENT NO.        : 8,217,605 B2          Page 1 of 1
APPLICATION NO.   : 12/673173
DATED             : July 10, 2012
INVENTOR(S)       : Peter Balazovic et al.

It is certified that error appears in the above-identified patent and that said Letters Patent is hereby corrected as shown below:

In the Claims:

In Column 12, Line 30, please change "Lq is" to --Lq(iq) is--.

Signed and Sealed this
Fourth Day of June, 2013

Teresa Stanek Rea
*Acting Director of the United States Patent and Trademark Office*